UNITED STATES PATENT OFFICE 2,029,960

PROCESS OF WATER PURIFICATION

Oliver M. Urbain, Columbus, Ohio, assignor to Charles H. Lewis, Harpster, Ohio

No Drawing. Application July 28, 1934, Serial No. 737,474

2 Claims. (Cl. 210—2)

This invention relates to the provision of a process for eliminating or removing from water solutions certain polluting organic compounds that possess an objectionable oxygen consuming capacity.

More specifically the invention contemplates a process for eliminating or removing amines and cyclic amides from water. The mechanism of the process resides in the incorporation in the water of a reagent or reagents capable of forming with the amines and cyclic amides either unobjectionable soluble addition products or insoluble and removable reaction products.

The reagents to be employed in the process are what I term the "acidic phenol group." It is my purpose to include in this group the nitrophenols and their substitution products. Illustrative examples are as follows:—

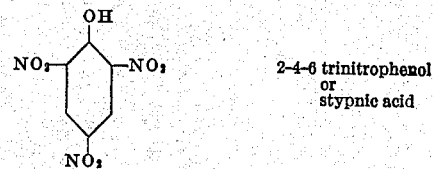

2-4-6 trinitrophenol or stypnic acid

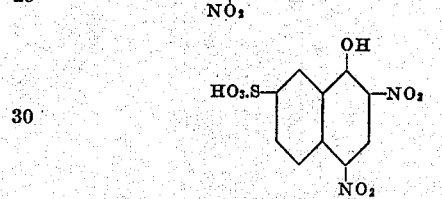

2.4-dinitro-1-naphthol-7-sulfonic acid

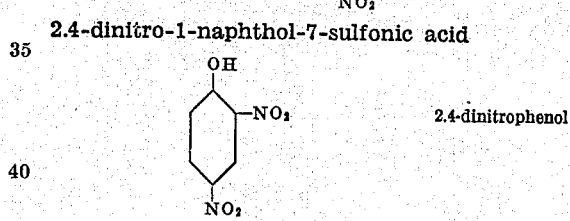

2.4-dinitrophenol

To the end that the general character and nature of the amines, the elimination or removal of which is effected by the process of this invention, the following general formula and definition is given:

R represents a hydrocarbon radical unsubstituted or substituted by any group or groups including the NH2 group which may be substituted or unsubstituted. R' and R'' may be H atoms, or one may be an H atom and the other a hydrocarbon radical either unsubstituted or substituted, or they may be both hydrocarbon radicals either unsubstituted or substituted. Or, R and R' may be a cyclic hydrocarbon radical, either substituted or unsubstituted, and R'' may be hydrogen or a hydrocarbon radical either substituted or unsubstituted.

All of the amines react with the reagents of the "acidic phenol group". An example of this type of reaction is as follows:—

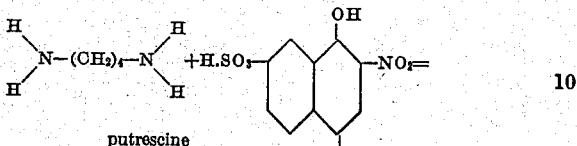

putrescine          flavianic acid

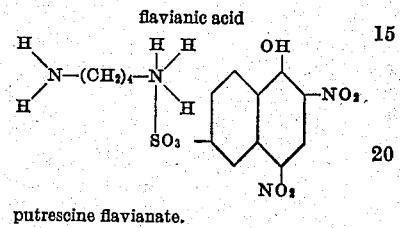

putrescine flavianate.

The cyclic amides which are eliminated or removed by the process of the present invention conform to the following general formula and definition.

General formula

R=a cyclic hydrocarbon residue, or radical unsubstituted or substituted by any group or groups including the

group. R'=either hydrogen or a hydrocarbon radical either unsubstituted or substituted by any group or groups.

The cyclic amides react with the reagents of the "acidic phenol group". An example of the latter is as follows:—

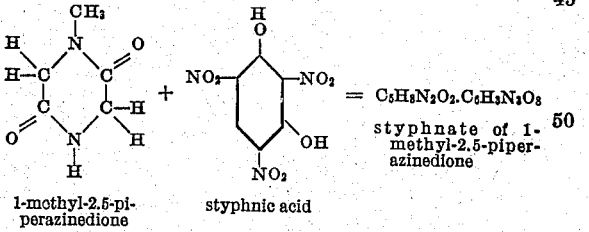

1-methyl-2,5-piperazinedione    styphnic acid    styphnate of 1-methyl-2,5-piperazinedione When the water contains both amines and cyclic amides the solution is first brought to a pH within the range of pH 7 to pH 7.5. The reagent or reagents are then added in molecular equivalent amounts to the compounds to be eliminated or removed. The amines and cyclic amides react mol for mol with the reagents of the "acidic phenol group".

After adding the reagent, the solution is subjected to a comparatively short period of agitation of the order of five minutes more or less and may then be passed to a detention zone to permit separation of insoluble addition products formed by the reactions effected in the process.

Having thus described my invention, what I claim is:—

1. A process for the elimination of amines and cyclic amides from water which comprises reacting therewith a reagent of the acidic phenol group.

2. A process for the elimination of amines and cyclic amides from water which comprises reacting therewith a reagent of the acidic phenol group while maintaining the solution at a pH within the range of from pH 7 to pH 7.5.

OLIVER M. URBAIN.